(12) United States Patent
Kimata et al.

(10) Patent No.: US 8,346,019 B2
(45) Date of Patent: Jan. 1, 2013

(54) IMAGE GENERATION METHOD AND APPARATUS, PROGRAM THEREFOR, AND STORAGE MEDIUM WHICH STORES THE PROGRAM

(75) Inventors: Hideaki Kimata, Yokosuka (JP); Shinya Shimizu, Yokosuka (JP); Kazuto Kamikura, Yokosuka (JP); Yoshiyuki Yashima, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 448 days.

(21) Appl. No.: 12/682,030

(22) PCT Filed: Oct. 9, 2008

(86) PCT No.: PCT/JP2008/068391
§ 371 (c)(1),
(2), (4) Date: Apr. 7, 2010

(87) PCT Pub. No.: WO2009/051064
PCT Pub. Date: Apr. 23, 2009

(65) Prior Publication Data
US 2010/0208991 A1    Aug. 19, 2010

(30) Foreign Application Priority Data
Oct. 15, 2007   (JP) .................................. 2007-267541

(51) Int. Cl.
*G06K 9/36* (2006.01)
(52) U.S. Cl. ........ 382/290; 382/164; 382/165; 382/167; 358/515; 358/518; 358/525

(58) Field of Classification Search .................. 382/164, 382/165, 167, 300; 358/515, 518, 525
See application file for complete search history.

(56) References Cited

U.S. PATENT DOCUMENTS
4,683,496 A    7/1987   Tom
(Continued)

FOREIGN PATENT DOCUMENTS
JP    11-102430 A    4/1999
(Continued)

OTHER PUBLICATIONS

Keita Takahashi and Takeshi Naemura, "Layered Light-Field Rendering with Focus Measurement", EURASIP Signal Processing: Image Communication, vol. 21, No. 6, pp. 519-530 (Jul. 2006) (in English).

(Continued)

*Primary Examiner* — Yosef Kassa
(74) *Attorney, Agent, or Firm* — Harness, Dickey & Pierce, P.L.C.

(57) ABSTRACT

An image generation method for generating image information of a color signal Y of an image A by using a color signal X of image A, and color signal X and color signal Y of an image B. The presence or absence of a point in color signal X of image B corresponding to each pixel position of color signal X of image A, and the position of the relevant corresponding point are estimated. To each estimated pixel position in color signal Y of image A, image information of the corresponding position in the second color signal Y of image B is assigned. Color signal Y at a pixel position in image A for which it is estimated that there is no corresponding point is generated by using the image information of color signal Y assigned to pixels having a corresponding point.

8 Claims, 8 Drawing Sheets

U.S. PATENT DOCUMENTS

| | | | |
|---|---|---|---|
| 5,583,665 A * | 12/1996 | Gregory et al. | 358/504 |
| 5,650,814 A | 7/1997 | Florent et al. | |
| 5,859,712 A * | 1/1999 | Kim | 358/504 |
| 6,424,752 B1 | 7/2002 | Katayama et al. | |
| 6,993,167 B1 * | 1/2006 | Skladnev et al. | 382/128 |
| 7,222,306 B2 * | 5/2007 | Kaasila et al. | 715/801 |
| 7,671,922 B2 * | 3/2010 | Leone et al. | 348/453 |
| 2003/0190072 A1 | 10/2003 | Adkins et al. | |

FOREIGN PATENT DOCUMENTS

| | | |
|---|---|---|
| JP | 11-242737 A | 9/1999 |
| JP | 2001-016621 A | 8/2002 |
| JP | 2005-130281 A | 5/2005 |
| KR | 10-1999-0045187 A | 6/1999 |
| RU | 2 267 232 C1 | 12/2005 |
| TW | 200811758 A | 3/2008 |
| TW | 200816791 A | 4/2008 |
| TW | 200816802 A | 4/2008 |
| WO | 2004/057531 A1 | 7/2004 |

OTHER PUBLICATIONS

M. Droese, T. Fujii and M. Tanimoto, "Ray-Space Interpolation Constraining Smooth Disparities Based on Loopy Belief Propagation", Proc. of IWSSIP2004, pp. 247-250, Poznan, Poland, Sep. 2004 (in English).

Takashi Matsuyama, Takeshi Takai, Xiaojunn Wu and Shohei Nobuhara, "Generation, Editing, and Visualization of 3D Video", Proceddings of The Virtual Reality Society of Japan, vol. 7, No. 4, pp. 521-532, 1002.12 (with English Abstract).

I. Tsubaki and K. Aizawa, "Demosaicing method from pixel mixture image", forum on Information Science and Technology, pp. 219-221, Sep. 2003 (in Japanese).

Tomomasa Gotoh and Masatoshi Okutomi, "High Resolution Color Image Reconstruction Using Raw Data of a Single Imaging Chip", IPSJ Transactions on Computer vision and Image Media, vol. 45, No. SIG 8(CVIM 9), pp. 15-25, 2004 (in Japanese with English Abstract).

Masayuki Tanaka and Masatoshi Okutomi, "A Fast Algorithm for Reconstruction-Based Super-Resolution and Its Accuracy Evaluation", Proceedings of IEICE, D-11 vol. J88-D-II, No. 11, pp. 2200-2209, 2005 (in Japanese with descriptions of figures in English).

Xiao, Gang, et al., "Analysis of Color Distortion and Improvement for IHS Image Fusion," International Conference on Intelligent Transportation Systems, Proceedings, IEEE, Oct. 12-15, 2003, pp. 80-85.

Winter, Michael E., et al., "Resolution Enhancement of Hyperspectral Data," Aerospace Conference Proceedings, IEEE, vol. 3, Mar. 9-16, 2002, pp. 1523-1529.

Ling, Li, et al., "Fusion of Images with Different Spatial Resolution," International Geoscience and Remote Sensing Symposium Proceedings, IEEE, Jul. 6-10, 1998, pp. 1310-1313.

Wilson, Terry A., et al., "Perceptual-Based Image Fusion for Hyperspectral Data," IEEE Transactions on Geoscience and Remote Sensing, vol. 35, No. 4, Jul. 1997, pp. 1007-1017.

* cited by examiner

MULTI-VIEW IMAGING SYSTEM HAVING STRAIGHT-LINE CAMERA ALIGNMENT

FIG. 8

MULTI-VIEW IMAGING SYSTEM HAVING PLANAR CAMERA ARRANGEMENT

FIG. 9

MULTI-VIEW IMAGING SYSTEM HAVING ARC CAMERA ARRANGEMENT

FIG. 10

MULTI-VIEW IMAGING SYSTEM HAVING SPHERICAL CAMERA ARRANGEMENT

FIG. 11

# IMAGE GENERATION METHOD AND APPARATUS, PROGRAM THEREFOR, AND STORAGE MEDIUM WHICH STORES THE PROGRAM

TECHNICAL FIELD

The present invention relates to a technique for generating image information for color signals by using a plurality of images.

Priority is claimed on Japanese Patent Application No. 2007-267541, filed Oct. 15, 2007, the contents of which are incorporated herein by reference.

BACKGROUND ART

Figure 7:
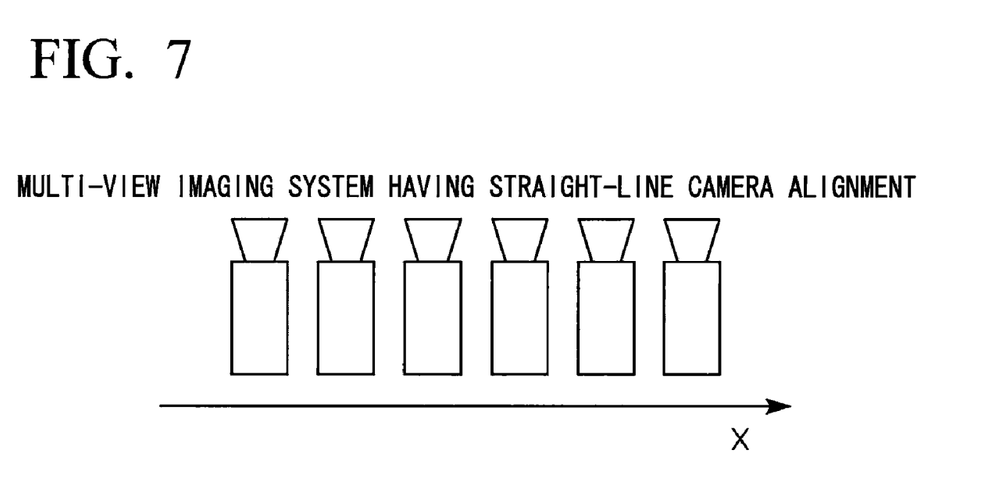
FIG. 7 is a diagram showing a multi-view imaging system having a straight-line alignment.
Figure 8:
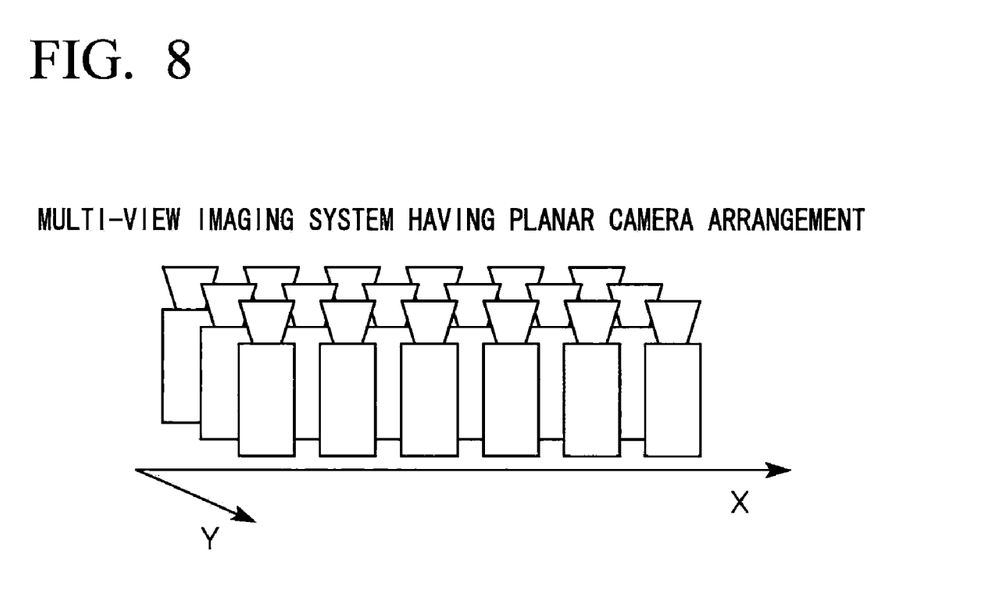
FIG. 8 is a diagram showing a multi-view imaging system having a planar arrangement.
Figure 9:
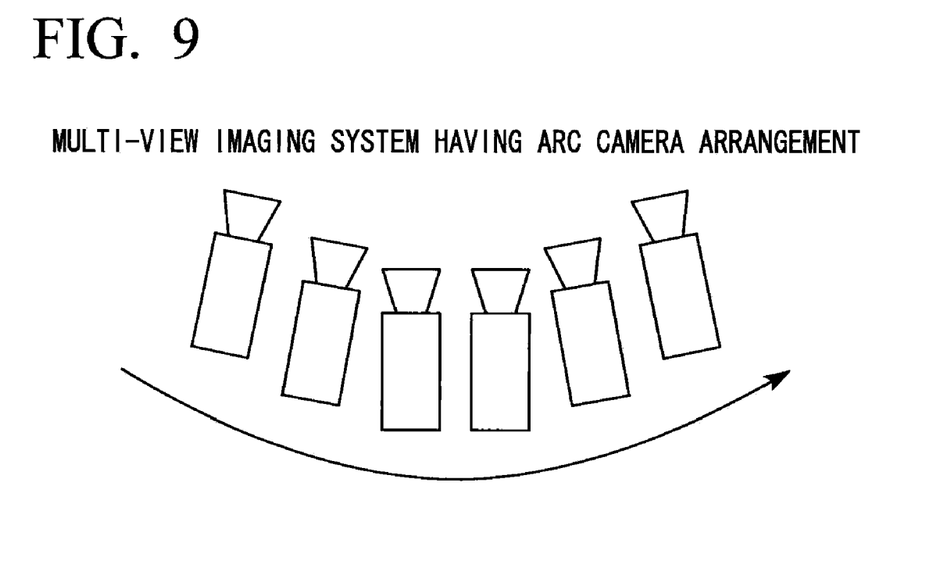
FIG. 9 is a diagram showing a multi-view imaging system having an arc arrangement.
Figure 10:
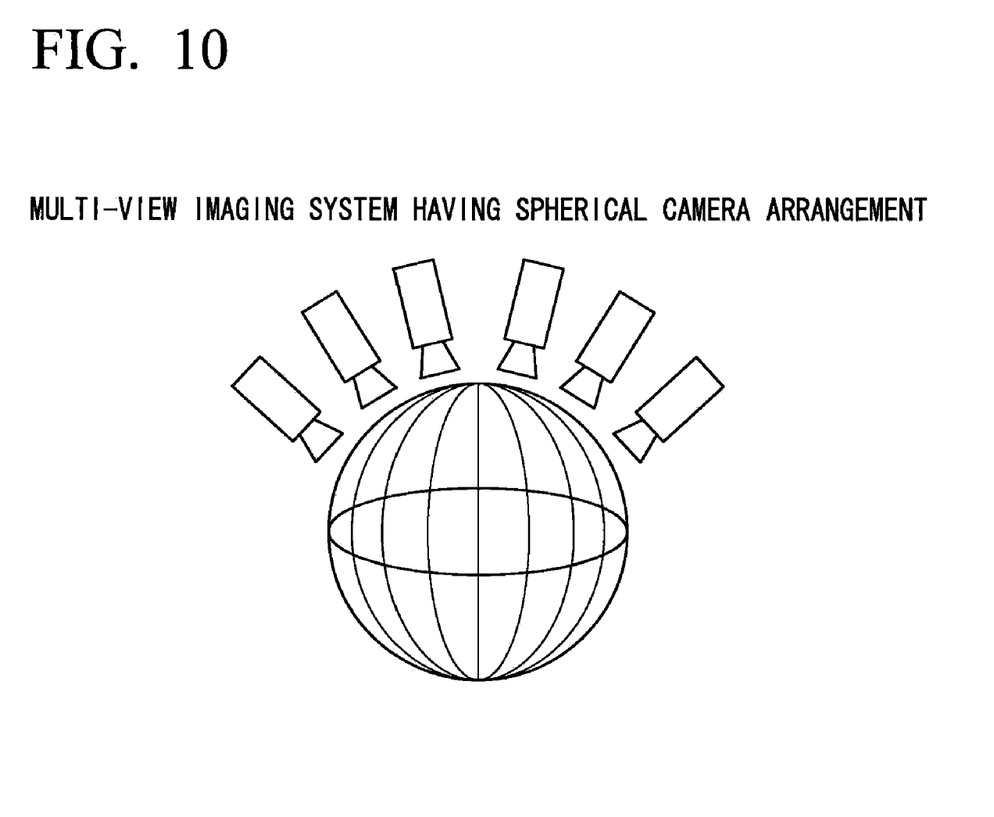
FIG. 10 is a diagram showing a multi-view imaging system having a spherical arrangement.

For multi-view imaging systems, FIG. 7 is a diagram showing an example of camera arrangement having a straight-line alignment, FIG. 8 is a diagram showing another example of camera arrangement having a planar arrangement, FIG. 9 is a diagram showing another example of camera arrangement having an arc arrangement, and FIG. 10 is a diagram showing another example of camera arrangement having a spherical arrangement.

The multi-view imaging systems for imaging a scene in different directions have been developed. In the multi-view imaging systems, the camera arrangement has various forms such as a one-dimensional arrangement on a straight line as shown in FIG. 7, a two-dimensional arrangement on a plane as shown in FIG. 8, an arc arrangement as shown in FIG. 9, or a spherical arrangement as shown in FIG. 10. Using such multi-view imaging systems makes it possible to archive video scenes in many directions.

In addition, there is a technique called "image synthesis" for generating image information at a virtual camera position (at which imaging is not performed) by using camera images obtained by multi-view imaging. In the image synthesis, it is assumed that a camera parameter which indicates the spatial direction in which the original video image was obtained is known.

The image synthesis can be performed by various methods. For example, there is a method of performing synthesis by estimating depth information. First, disparity information is obtained by searching corresponding points between original video images, and depth information of the relevant scene is estimated based on the disparity information. Then, depth information at the virtual camera position is estimated, and corresponding image information is generated using image information of the original cameras (see Non-Patent Document 1).

In another example of the methods, no estimation of depth information is performed, but image information at the virtual camera position is directly generated using disparity information of original images (see Non-Patent Document 2).

In another example, a plurality of camera images are used for estimating a three-dimensional model information of an object which is present in the relevant scene, and an image of the model projected from the virtual camera position is generated (see Non-Patent Document 3).

In the above-described imaging systems, imaging is generally performed using image signals having a Bayer arrangement, and the Bayer arrangement is subjected to demosaicing to obtain RGB signals or YUV signals (i.e., luminance signal Y and chrominance signals U and V).

Demosaicing is a process of estimating the three color components (RGB) of each pixel position, based on an R, G, or B signal assigned to each pixel position obtained using the Bayer arrangement (see Non-Patent Document 4). As demosaicing corresponds to increasing of the resolution of the signal of each color component from a low value to a high value, it may be performed together with a super-resolution technique (see Non-Patent Document 5).

Additionally, in the above-described imaging systems, cameras having the same resolution are generally used, however, those having different resolutions may be used. It is possible to reduce the amount of obtained image information by using a combination of a camera having a high resolution and a camera having a low resolution. In addition, the cameras may have different focusing positions or viewing angles. In such a case, even when each image signal to be obtained has the same resolution, each area which is actually imaged has an individual resolution.

To obtain an image having a high resolution based on an image having a low resolution, an enlarging method of applying an up-sampling filter to each image signal in an image having a low resolution and a super-resolution method are known.

In the enlarging method, an image signal is obtained by applying an appropriate filter to image signals in a peripheral area. In the super-resolution method, generally, information of a plurality of images having the same resolution, which were sequentially obtained, is used (see Non-Patent Document 6). First, an image having a resolution higher than the obtained image is defined as a target image. That is, each pixel position of a target to be generated is defined in advance. Next, a corresponding relationship between the obtained images is estimated, and each image signal obtained by imaging is assigned to the corresponding target pixel position, thereby obtaining image information having a high resolution.

Figure 11:
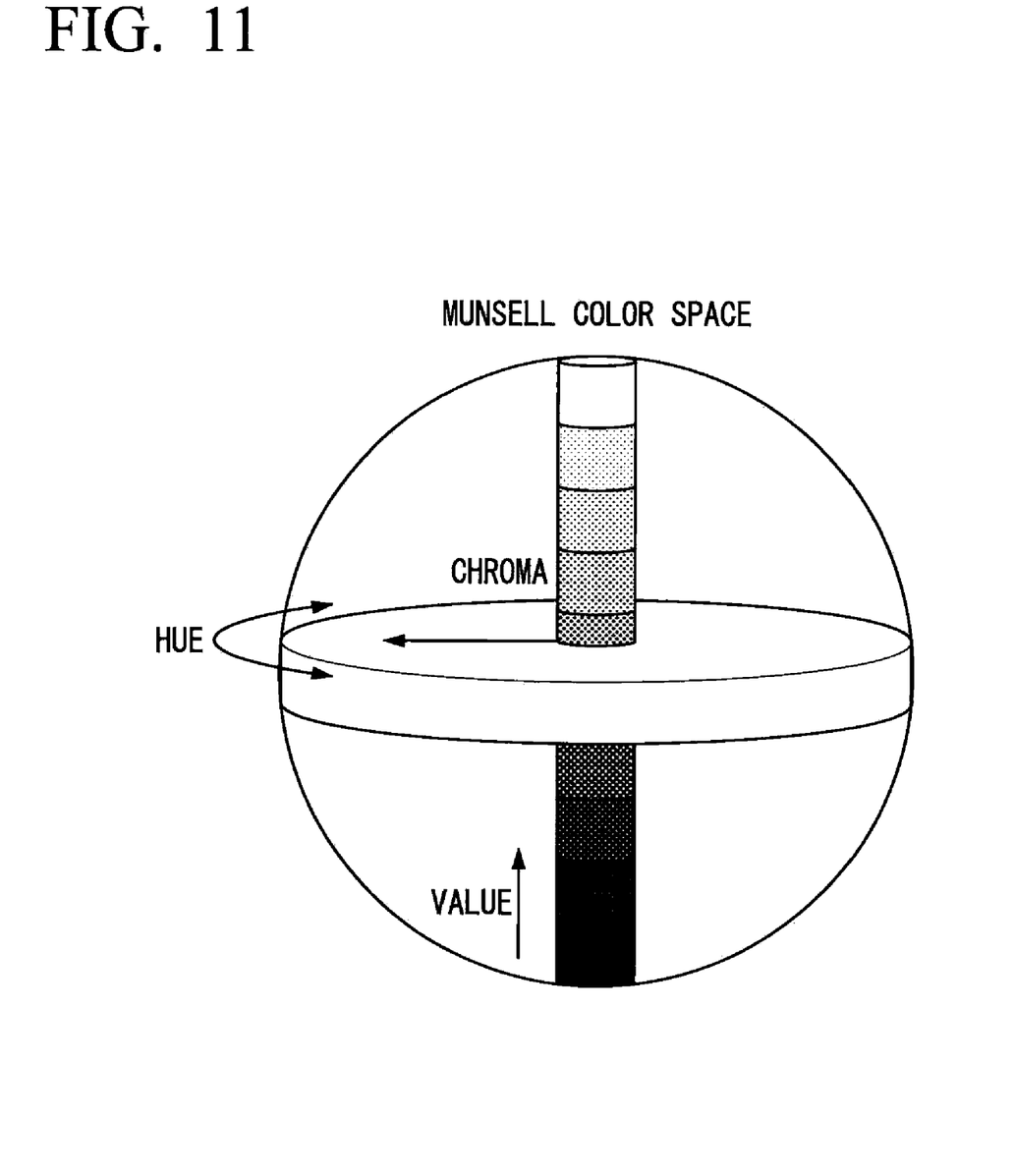
FIG. 11 is a diagram showing a Munsell color space.

In order to represent color signals of an image, an RGB or YUV format is known. As a uniform color space, FIG. 11 shows a Munsell color space invented by Munsell. In the Munsell color space, colors are represented using hue, value, and chroma.

The "hue" indicates tint, and has five basic hues of red (R), yellow (Y), green (G), blue (B), and purple (P). That is, 10 hues are defined together with intermediate hues such as yellow-red (YR), yellow-green (GY), blue-green (BG), blue-purple (PB), and red-purple (RP).

The "value" indicates brightness, where 0 is assigned to ideal black for complete absorption, and 10 is assigned to ideal white for complete reflection. Between them, 10 levels are defined at sensibly equal intervals. The chroma indicates vividness.

The Munsell symbol is represented as HV/C (hue·value/chroma).

When representing the Munsell color space using a chart, the hue is regularly arranged along a circumference so as to form a hue circle. For the chroma, the farther from the center, the higher the chroma, which produces a more vivid color. As an approximate space for the Munsell color space, a CIE L*a*b* space or a CIE L*u*v* space has been proposed.

Non-Patent Document 1: Keita Takahashi and Takeshi Naemura,"Layered Light-Field Rendering with Focus Measurement", EURASIP Signal Processing: Image Communication, vol. 21, no. 6, pp. 519-530 (2006.7).

Non-Patent Document 2: M. Droese, T. Fujii and M. Tanimoto,"Ray-Space Interpolation Constraining Smooth Disparities Based On Loopy Belief Propagation", Proc. of IWSSIP2004, pp. 247-250, Poznan, Poland, September 2004.

Non-Patent Document 3: Takashi Matsuyama, Takeshi Takai, Xiaojunn Wu, and Shohei Nobuhara, "Generation, Editing, and Visualization of 3D Video", Proceedings of The Virtual Reality Society of Japan, Vol. 7, No. 4, pp. 521-532, 2002.12.

Non-Patent Document 4: I. Tsubaki and K. Aizawa, "Demosaicing method from pixel mixture image", Forum on Information Science and Technology, pp. 219-222, September 2003.

Non-Patent Document 5: Tomomasa Goto and Masatoshi Okutomi, "High Resolution Color Image Reconstruction Using Raw Data of a Single Imaging Chip", IPSJ Transactions on Computer Vision and Image Media, Vol. 45, No. SIG 8(CVIM 9), pp. 15-25, 2004.

Non-Patent Document 6: Masayuki Tanaka and Masatoshi Okutomi, "A Fast Algorithm for Reconstruction-Based Super-Resolution and Its Accuracy Evaluation", Proceedings of IEICE, D-II vol. J88-D-II, No. 11, pp. 2200-2209, 2005.

DISCLOSURE OF INVENTION

Problem to be Solved by the Invention

For a novel technique found by the inventors of the present invention for processing a multi-view image which does not have a fixed number of colors, the present invention relates to using a plurality of cameras having different resolutions, and an object of the present invention is to provide a method for restoring high-frequency color signal information which a low-resolution image does not have, thereby reducing degradation in subjective image quality.

Means for Solving the Problem

When using cameras having different resolutions in a multi-view imaging system, both an image having a high resolution and an image having a low resolution are present. Even when using cameras having the same resolution, the amount of information can be reduced by decreasing the resolution of a part of the cameras, which is preferable for the compression of a multi-view image. Also in such a case, both an image having a high resolution and an image having a low resolution are present.

The present invention assumes a case in which each color signal has an individual resolution. In an example case, a plurality of images have the same resolution for the Y signal, but have different resolutions for the U signal or the V signal.

In such a case, while a color signal has a constant resolution, image information of another color signal having a low resolution misses a high-frequency component.

Therefore, image information obtained at a camera position corresponding to a low resolution has a lower subjective image quality than image information obtained at a camera position corresponding to a high resolution.

The present invention solves the above problem, and provides a technique for restoring high-frequency color signal information which a low-resolution image does not have, thereby reducing degradation in subjective image quality.

The present invention will be generally explained. For example, the total amount of image information to be processed can be reduced by imaging a scene using a plurality of cameras, each of which has an individual number of colors, in comparison with processing all of the relevant colors. Therefore, the amount of code of a multi-view video image can be considerably reduced by reducing the number of colors for a part of video signals in the multi-view video image.

Here, the number of colors may be "three" of RGB or the like. However, when there is a color which is not included in the obtained image, only information of this color is missing, which degrades the subjective image quality and limits the amount the code generated for the multi-view video image can be reduced.

The present invention solves such a problem by providing a technical device for restoring missing color information in a part of video signals by using another video signal. In conventional techniques, a multi-view video image which does not have a constant number of colors is not handled. The object of the present invention is generated from a novel technical concept of handling a multi-view video image which does not have a constant number of colors.

In particular, the present invention uses corresponding point information between pixels in a plurality of images so that color information of a target image is restored using color information obtained using another camera. The present invention has specific distinctive features as follows.

The present invention provides an image generation method for generating image information of a color signal Y of an image A by using a color signal X of image A, and color signal X and color signal Y of an image B, the method executing:

a corresponding point estimating step that estimates the presence or absence of a point in color signal X of image B corresponding to each pixel position of color signal X of image A and also estimates the position of the relevant corresponding point;

a corresponding image assigning step that assigns, to each pixel position in color signal Y of image A for which the corresponding point estimating step estimates that there is a corresponding point, image information of the corresponding position in the second color signal Y of image B; and an image interpolation step that generates color signal Y at a pixel position in image A for which the corresponding point estimating step estimates that there is no corresponding point, by using the image information of color signal Y assigned by the corresponding image assigning step.

In accordance with the above image generation method, image information of another color signal of a desired image can be generated using information of a color signal included in another image.

If an image signal corresponding to a target pixel position for the generation, the relevant image information can be generated by means of interpolation using already-generated peripheral image signals having a high resolution, thereby preventing missing of image information.

In the corresponding point estimation, corresponding point information may be provided as input data, or each corresponding point may be searched for by using image information. When providing the corresponding point information as input data, depth information or geometric information of the relevant scene may be estimated in advance, and then corresponding points between the images may be estimated.

When searching for each corresponding point, the absolute value of each difference between corresponding pixels may be computed. When the minimum absolute value is smaller than or equal to a predetermined threshold, a point which produces the minimum value may be estimated to be a corresponding point. When the minimum absolute value is larger than the threshold, it may be estimated that there is no corresponding point.

It is also preferable to store the threshold together with the relevant image information of an original color signal by means of filing. When generating image information of another color signal using the stored image information of the original color signal, the same image can always be generated by using the threshold included in the relevant file.

When imaging a scene in a plurality of directions by using cameras having different color signals, image information of a color signal of a desired camera can be generated using an image of another camera.

This method can be applied not only to a multi-view image but also to a video image obtained by a single camera. That is, when frames in a video image have different color signals, image information of a color signal of a desired frame can be generated using a color signal of another frame.

The above image generation method may further execute:

a threshold setting step that sets a threshold used in the corresponding point estimation performed by the corresponding point estimating step;

an image A color converting step that generates a color signal M of image A by using color signal X of image A and color signal Y of image A which was generated by the corresponding image assigning step and the image interpolation step;

an image B color converting step that generates color signal M of image B by using color signal X and color signal Y of image B;

a difference generating step that computes a difference between color signal M of image A and color signal M of image B at each corresponding point obtained by the corresponding point estimating step;

a generated difference summing step that computes the sum of differences obtained by the difference generating step; and a threshold determination step that determines the threshold which produces the minimum value in the sums of the differences computed by the generated difference summing step based on a result of repetition of the above steps while changing the threshold set by the threshold setting step within a predetermined range.

In accordance with the above image generation method, when generating a color signal using the above-described method of the invention, the magnitude of degradation due to an error in the corresponding point estimation is measured in another color space, and a threshold used for corresponding point estimation can be determined while minimizing the degradation.

If the magnitude of degradation is measured by means of mapping to another color space, the value, chroma, and hue of the Munsell color space are examples of a color space for the mapping.

Degradation in the subjective image quality can be reduced by minimizing the degradation in the subjective image quality of the generated image.

The threshold parameter can be used as explained below. After the threshold is estimated, the value is appended as a threshold parameter to original image information. For example, the threshold parameter is also stored in a file together with the original image and another relevant image. When reading the file, image information of a color signal of the original image can be generated based on the original image and the other image by using the above threshold parameter, where the image has a minimum degradation in the subjective image quality.

The above image generation method may further execute:

a threshold setting step that sets a threshold used in the corresponding point estimation performed by the corresponding point estimating step;

a difference generating step that computes a difference between another color signal O of image A and color signal Y of image B;

a generated difference summing step that computes the sum of differences obtained by the difference generating step; and a threshold determination step that determines the threshold which produces the minimum value in the sums of the differences computed by the generated difference summing step based on a result of repetition of the above steps while changing the threshold set by the threshold setting step within a predetermined range.

In accordance with the above image generation method, when generating a color signal using the above-described method of the invention, the magnitude of degradation due to an error in the corresponding point estimation is measured, and a threshold used for corresponding point estimation can be determined while minimizing the degradation. In this process, it is possible to generate a color signal, where the difference between the color signal and the originally-present color signal (O) is minimum.

Additionally, similar to the above-described method, the obtained threshold parameter can be stored in a file.

The present invention also provides image generation apparatuses which generates images in accordance with the above methods.

Effect of the Invention

In accordance with the present invention, for image information obtained at a camera position using a color signal, image information obtained using another color signal can be used for generating a color signal of the desired image information, thereby reducing degradation in the subjective image quality.

REFERENCE SYMBOLS 101, 201, 301 corresponding point estimator
102, 202, 302 corresponding image assigning unit
103, 203, 303 image interpolator
204 image A color converter
205 image B color converter 206, 306 difference generator
207, 307 generated difference summing unit
208, 308 threshold setting unit
209, 309 threshold determination unit

BEST MODE FOR CARRYING OUT THE INVENTION

Embodiment of the image generation apparatus of the present invention will be shown with reference to the drawings.

First Embodiment

In a first embodiment, a color signal X of an image A and color signals X and Y of a color signal B, the image being obtained using different cameras, are used for generating the color signal Y of image A.

Figure 1:
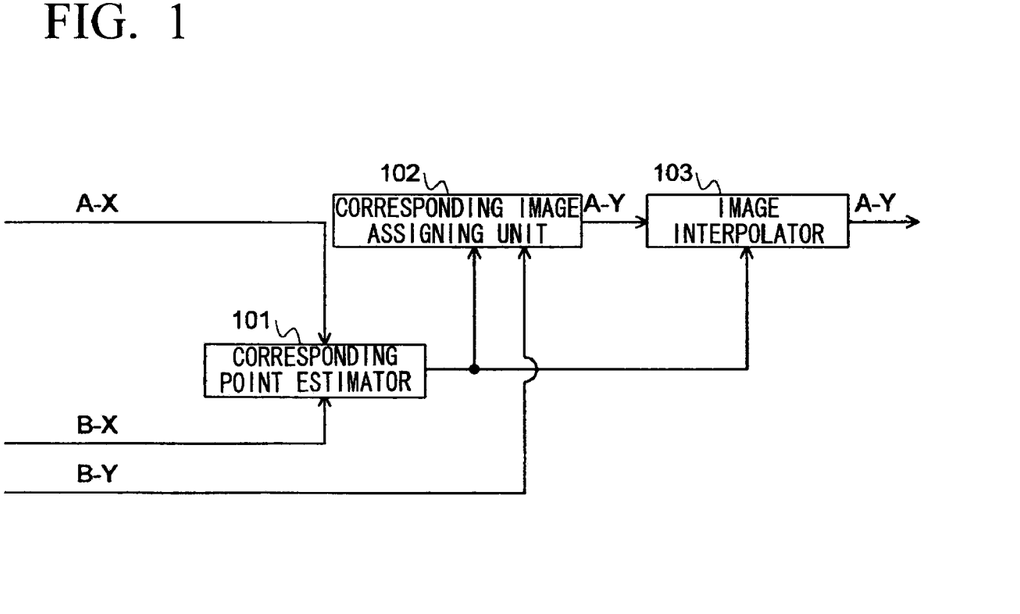
FIG. 1 is a diagram showing the structure of an image generation apparatus as a first embodiment of the present invention.

FIG. 1 shows a general structure of the apparatus. That is, the image generation apparatus of the present embodiment has a corresponding point estimator 101 for estimating presence or absence of a point in color signal X of image B corresponding to each pixel position of color signal X of image A and also for estimating the position of the relevant corresponding point, a corresponding image assigning unit 102 for assigning, to color signal Y at each pixel position in image A for which the corresponding point estimator 101 estimates that there is a corresponding point, image information of the corresponding position in color signal Y of image B, and an image interpolator 103 for generating color signal Y at each pixel position in image A for which the corresponding point estimator 101 estimates that there is no corresponding point, by using the image information of color signal Y assigned by the corresponding image assigning unit 102.

The corresponding point estimator 101 uses camera parameters or a known matching technique for assuming one or more candidates of a pixel (in color signal X of image B) corresponding to each pixel in color signal X of image A, and computes an absolute value of the difference between each pair of corresponding pixels. When the minimum value of the computed absolute value(s) is smaller than or equal to a predetermined threshold, the corresponding point estimator 102 estimates the point which produces the minimum value to be the corresponding point. When the minimum value of the computed absolute value(s) is larger than the predetermined threshold, the corresponding point estimator 102 estimates that there is no point corresponding to the relevant pixel in color signal X of image A.

The image interpolator 103 generates the image information of color signal Y at each pixel position in color signal X of image A for which it is estimated that there is no corresponding point, by using the image information at pixel positions in color signal Y of image B, which was assigned due to an estimation result that there are corresponding points. More specifically, linear interpolation is performed in accordance with distances measured from the pixel positions to which the image information in image B was assigned.

Figure 2:
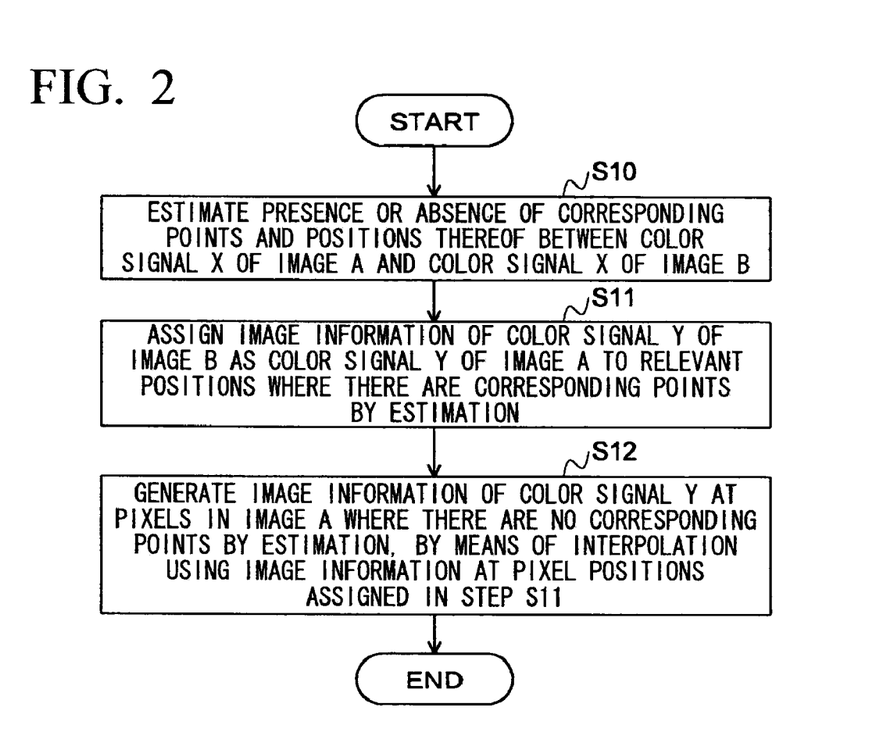
FIG. 2 is a flowchart showing the operation of the image generation apparatus of the embodiment.

Based on the above premise, the image generation apparatus in FIG. 1 operates as explained below. FIG. 2 is a flowchart showing the operation.

First, the corresponding point estimator 101 estimates the presence or absence of the corresponding points and positions thereof between image color signal X of image A and color signal X of image B (see step S10). To each pixel for which the corresponding point estimator 101 estimates that there is a corresponding point, the corresponding image assigning unit 102 assigns image information of the corresponding point in color signal Y of image B, as color signal Y of image A (see step S11). As described above, the image interpolator 103 generates image information by means of interpolation using the image information which was already assigned by the corresponding image assigning unit 102 (see step S12). Color signal Y of image A is generated by the above operation.

The corresponding point estimator 101 computes the absolute value of each difference between the relevant pixels in the above operation. However, estimation may be performed using a block consisting of a plurality of pixels whose center pixel is the target pixel for estimation. For example, for each pixel in color signal X of image A, one or more candidates of a corresponding pixel in signal Y are assumed, and the total sum of absolute values of differences from a plurality of pixels which faun a block and whose center is each candidate. The position of the candidate which produces the minimum value of the total sums may be estimated to be the corresponding point.

The image interpolator 103 generates the relevant image information by means of linear interpolation in the above operation. However, the image information may be generated through a non-linear process. In either case, the image information is generated using the image information which was already assigned by the corresponding image assigning unit 102.

In the above example, color signal X of image A and color signals X and Y of image B, the images being obtained by different cameras, are used for generating color signal Y of image A. However, color signal X of image A and color signals X and Y of image B, which were obtained by a common camera at different times, may be used for generating color signal Y of image A.

Although color signal X of image A and color signals X and Y of image B are used for generating color signal Y of image A in the above embodiment, images A and B may have a plurality of signals other than color signal Y. An example in which images A and B have two other color signals (X and Z) will be shown below. The operation of the apparatus in this case will be explained while the structure is the same as above.

First, the corresponding point estimator 101 estimates the presence or absence of the corresponding points and positions thereof between color signal X of image A and color signal X of image B as described above. To each position of color signal Y of image A for which the corresponding point estimator 101 estimates that there is a corresponding point, the corresponding image assigning unit 102 assigns image information of the corresponding position in color signal Y of image B. Similarly, the corresponding point estimator 101 estimates the presence or absence of the corresponding points and positions thereof between color signal Z of image A and color signal Z of image B. To each position of color signal Y of image A for which the corresponding point estimator 101 estimates that there is a corresponding point, the corresponding image assigning unit 102 assigns image information of the corresponding position in color signal Y of image B.

Color signal Y of Image A is generated by the above operation.

Second Embodiment

Similar to the first embodiment, in a second embodiment, a color signal X of an image A and color signals X and Y of a color signal B, the image being obtained using different cameras, are used for generating the color signal Y of image A. However, the generated image information is mapped into another color space so as to measure the degree of degradation, and to obtain a threshold for minimizing the degradation.

Figure 3:
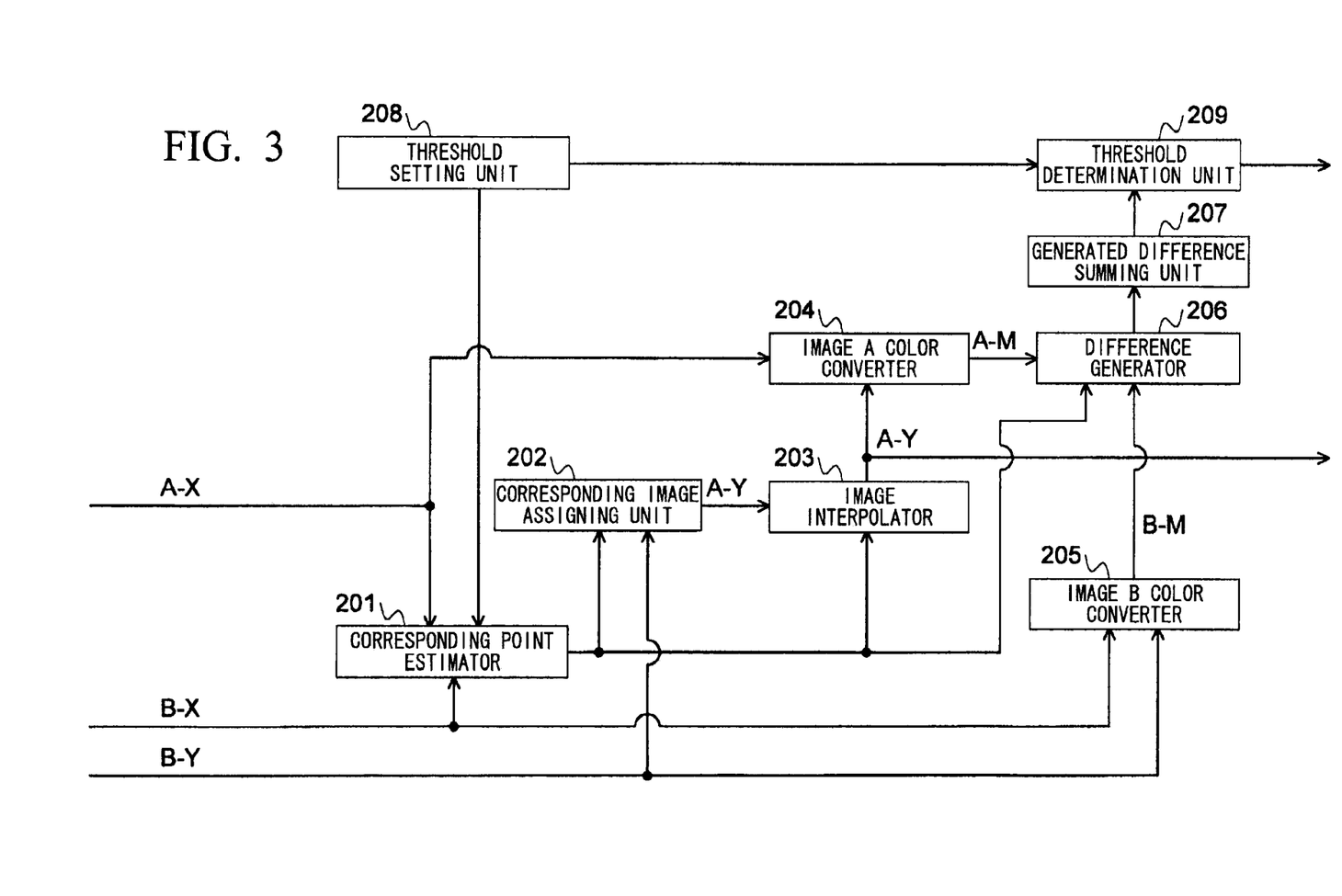
FIG. 3 is a diagram showing the structure of an image generation apparatus as a second embodiment of the present invention.

FIG. 3 shows a general structure of the apparatus. That is, the image generation apparatus of the present embodiment has:

(i) a threshold setting unit 208 for setting a threshold within a predetermined range,
(ii) a corresponding point estimator 201 for estimating the presence or absence of a point in color signal X of image B corresponding to each pixel position of color signal X of image A and also estimating the position of the relevant corresponding point, by using the threshold set by the threshold setting unit 208,
(iii) a corresponding image assigning unit 202 for assigning, to color signal Y at a pixel position in image A for which the corresponding point estimator 201 estimates that there is a corresponding point, image information of the corresponding position in color signal Y of image B,
(iv) an image interpolator 203 for generating color signal Y at a pixel position in image A for which the corresponding point estimator 201 estimates that there is no corresponding point, by using the image information of color signal Y assigned by the corresponding image assigning unit 202,
(v) an image A color converter 204 for generating a color signal M of image A by using color signal X of image A and color signal Y of image A which was assigned and generated by the corresponding image assigning unit 202 and the image interpolator 203,
(vi) an image B color converter 205 for generating a color signal M of image B by using color signals X and Y of image B,
(vii) a difference generator 206 for computing a difference between color signal M of image A and color signal M of image B at each corresponding point obtained by the corresponding point estimator 201,
(viii) a generated difference summing unit 207 for computing the sum of the differences (for all corresponding points) obtained by the difference generator 206, and
(ix) a threshold determination unit 209 for determining the threshold which produces the minimum value in the sums of the differences computed by the generated difference summing unit 207.

The threshold setting unit 208 increases the threshold by increments of 10 from 10 to 50. The image A color converter 204 and the image B color converter 205 performs color space conversion into color signal M corresponding to the hue of the Munsell color space, where fixed values are assigned to the remaining color components (i.e., value and chroma).

Figure 4:
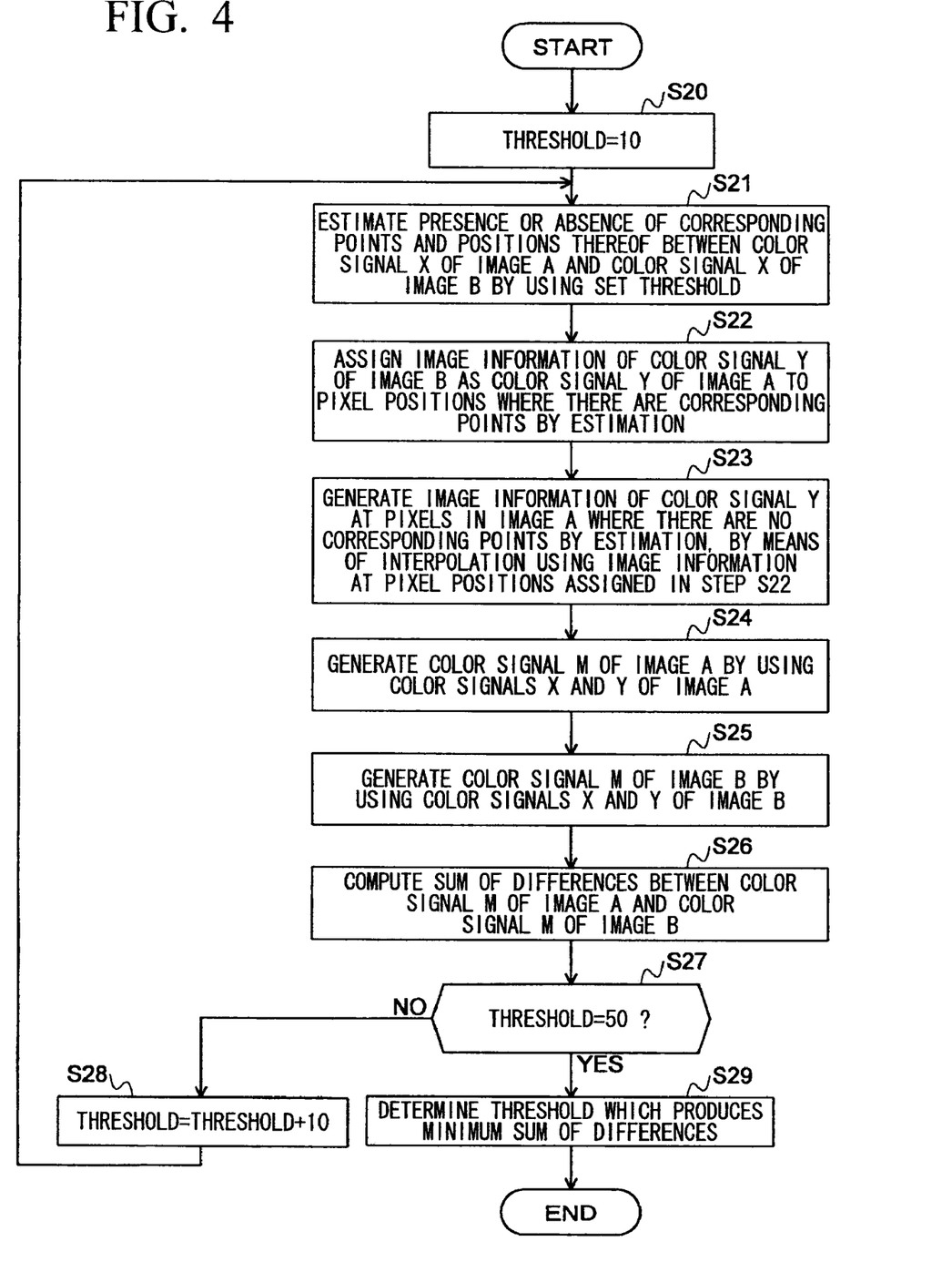
FIG. 4 is a flowchart showing the operation of the image generation apparatus of the embodiment.

Based on the above premise, the image generation apparatus in FIG. 3 operates as explained below. FIG. 4 is a flowchart showing the operation.

First, the threshold setting unit 208 sets the threshold to 10 (see step S20).

The corresponding point estimator 201 uses the set threshold so as to estimate the presence or absence of the corresponding points and positions thereof between color signal X of image A and color signal X of image B (see step S21).

The corresponding image assigning unit 202 assigns image information of each position in color signal Y of image B, for which the corresponding point estimator 201 estimates that there is a corresponding point, to color signal Y of image A (see step S22).

For each position for which the corresponding point estimator 201 estimates that there is no corresponding point, the image interpolator 203 generates image information of color signal Y of image A by means of interpolation using the image information which was already assigned by the corresponding image assigning unit 202 (see step S23).

The image A color converter 204 performs conversion from color signals X and Y of image A into a hue signal (i.e., color signal M) (see step S24).

The image B color converter 206 performs conversion from color signals X and Y of image B into a hue signal (color signal M) (see step S25).

The difference generator 206 generates differences in hue signals between image A and image B (see step S26).

The generated difference summing unit 207 computes the sum of the differences (see step S27).

The above operation executed by the units from the threshold setting unit 208 to the generated difference summing unit 207 is repeatedly performed while increasing the threshold by increments of 10 up to 50 (see steps S27 and S28).

Next, the threshold determination unit 209 determines the threshold which produces the minimum value obtained by the generated difference summing unit 207 (see step S29).

In the present embodiment, the image A color converter 204 and the image B color converter 205 performs conversion into a color signal corresponding to the hue of the Munsell color space. However, they may perform conversion into another color signal of the Munsell color space, that is, a value or chroma signal.

Third Embodiment

Similar to the first embodiment, in a third embodiment, a color signal X of an image A and color signals X and Y of a color signal B, the image being obtained using different cameras, are used for generating the color signal Y of image A.

However, image A originally has a color signal O (different from signal X), and the generated color signal Y is approximate to the color signal O.

A threshold for minimizing the difference (i.e., degree of degradation) between the generated color signal Y and the color signal O is computed.

Figure 5:
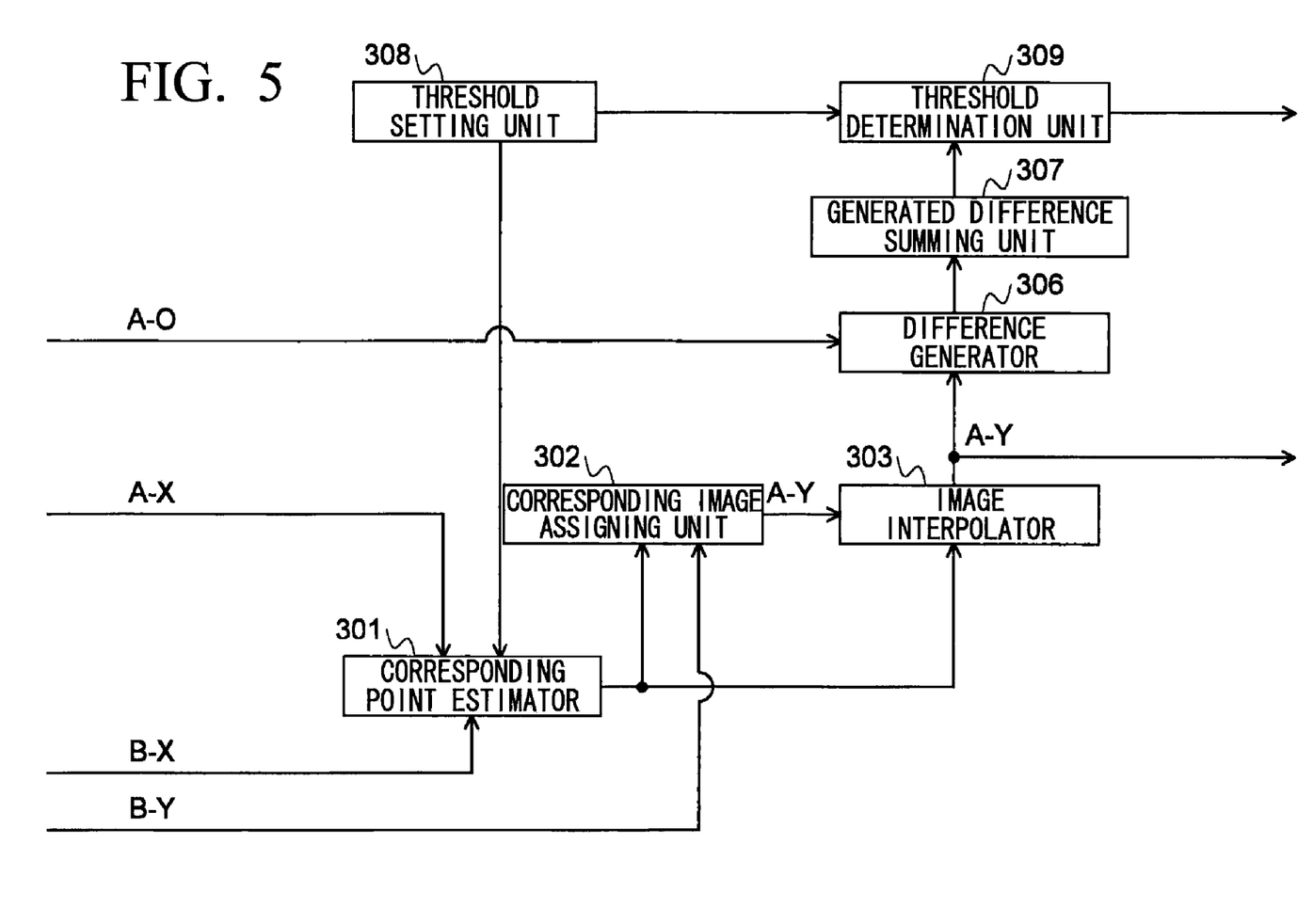
FIG. 5 is a diagram showing the structure of an image generation apparatus as a third embodiment of the present invention.

FIG. 5 shows a general structure of the apparatus, the image generation apparatus of the present embodiment has:

(i) a threshold setting unit 308 for setting a threshold within a predetermined range,
(ii) a corresponding point estimator 301 for estimating presence or absence of a point in color signal X of image B corresponding to each pixel position of color signal X of image A and also estimating the position of the relevant corresponding point, by using the threshold set by the threshold setting unit 308,
(iii) a corresponding image assigning unit 302 for assigning, to color signal Y at a pixel position in image A for which the corresponding point estimator 301 estimates that there is a corresponding point, image information of the corresponding position in color signal Y of image B,
(iv) an image interpolator 303 for generating color signal Y at a pixel position in image A for which the corresponding point estimator 301 estimates that there is no corresponding point, by using the image information of color signal Y assigned by the corresponding image assigning unit 302,
(v) a difference generator 306 for computing a difference between color signal O of image A and color signal Y of image A which was assigned and generated by the corresponding image assigning unit 302 and the image interpolator 303,
(vi) a generated difference summing unit 307 for computing the sum of the differences obtained by the difference generator 306, and (vii) a threshold determination unit 309 for determining the threshold which produces the minimum value in the sums of the differences computed by the generated difference summing unit 307.

The threshold setting unit 308 increases the threshold by increments of 10 from 10 to 50.

Figure 6:
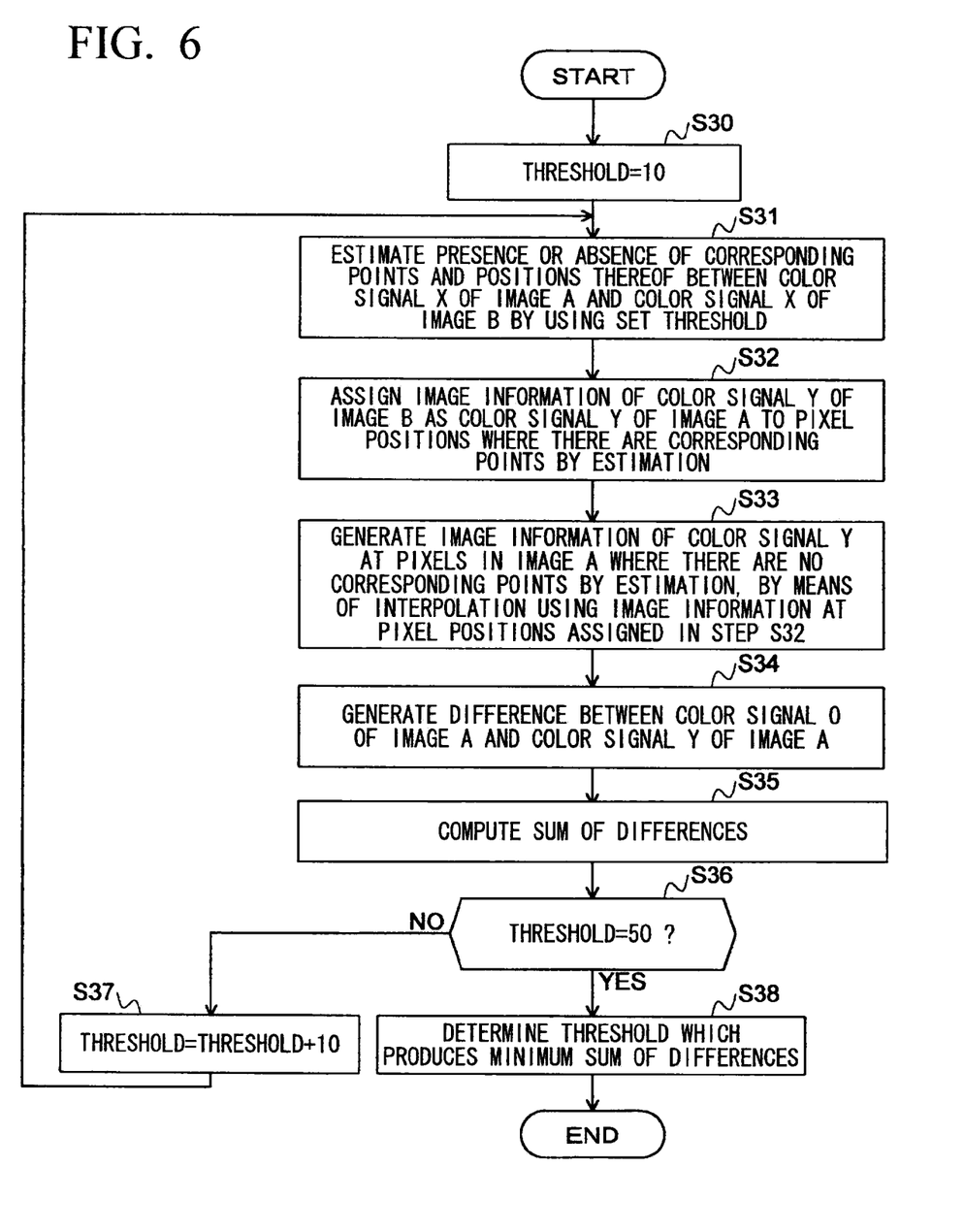
FIG. 6 is a flowchart showing the operation of the image generation apparatus of the embodiment.

Based on the above premise, the image generation apparatus of FIG. 5 operates as explained below. FIG. 6 is a flowchart showing the operation.

First, the threshold setting unit 308 sets the threshold to 10 (see step S30).

The corresponding point estimator 301 uses the set threshold so as to estimate the presence or absence of the corresponding points and positions thereof between color signal X of image A and color signal X of image B (see step S31).

The corresponding image assigning unit 302 assigns image information of each position in color signal Y of image B, for which the corresponding point estimator 301 estimates that there is a corresponding point, to color signal Y of image A (see step S32).

For each position for which the corresponding point estimator 301 estimates that there is no corresponding point, the image interpolator 303 generates image information of color signal Y of image A by means of interpolation using the image information which was already assigned by the corresponding image assigning unit 302 (see step S33).

The difference generator 306 generates differences between color signal O of image A and color signal Y of image A (see step S34).

The generated difference summing unit 307 computes the sum of the differences (see step S35).

The above operation executed by the units from the threshold setting unit 308 to the generated difference summing unit 307 is repeatedly performed while increasing the threshold by increments of 10 up to 50 (see steps S36 and S37).

Next, the threshold determination unit 309 determines the threshold which produces a minimum value obtained by the generated difference summing unit 307 (see step S38).

In the above-described embodiments, operations for input images by a plurality of cameras were explained. However, the methods in accordance with the present invention can be applied, not only to such a multi-view image, but also to a video image by a single camera. That is, if the color components of each frame in a video image are not constant, a color signal of another frame of the image can be used for generating a desired image signal of the image.

The above-described image generating operation can also be implemented by a computer and a software program. Such a computer program may be provided by storing it in a computer-readable storage medium, or by means of a network.

INDUSTRIAL APPLICABILITY

In accordance with the present invention, for image information obtained at a camera position using a color signal, image information obtained using another color signal can be used for generating a color signal of the desired image information, thereby reducing degradation in the subjective image quality.

The invention claimed is:

1. An image generation method for generating image information of a second color signal Y of a first image A by using a first color signal X of the first image A, and the first color signal X and the second color signal Y of a second image B, the method comprising:

a corresponding point estimating step that estimates presence or absence of a point in the first color signal X of the second image B corresponding to each pixel position of the first color signal X of the first image A and also estimates the position of the relevant corresponding point;

a corresponding image assigning step that assigns, to each pixel position in the second color signal Y of the first image A for which the corresponding point estimating step estimates that there is a corresponding point, image information of the corresponding position in the second color signal Y of the second image B; and an image interpolation step that generates the second color signal Y at a pixel position in the first image A for which the corresponding point estimating step estimates that there is no corresponding point, by means of interpolation using the image information of the second color signal Y assigned by the corresponding image assigning step.

2. The image generation method in accordance with claim 1, further comprising:

a threshold setting step that sets a threshold used in the corresponding point estimation performed by the corresponding point estimating step;

a first image A color converting step that generates a third color signal M of the first image A by using the first color signal X of the first image A and the second color signal Y of the first image A which was generated by the corresponding image assigning step and the image interpolation step;

a second image B color converting step that generates the third color signal M of the second image B by using the first color signal X and the second color signal Y of the second image B;

a difference generating step that computes a difference between the third color signal M of the first image A and the third color signal M of the second image B at each corresponding point obtained by the corresponding point estimating step;

a generated difference summing step that computes the sum of differences obtained by the difference generating step; and a threshold determination step that determines the threshold which produces the minimum value in the sums of the differences computed by the generated difference summing step based on a result of repetition of the corresponding point estimating step, the corresponding image assigning step, the image interpolation step, the first image A color converting step, the second image B color converting step, the difference generating step, and the generated difference summing step while changing the threshold set by the threshold setting step within a predetermined range.

3. The image generation method in accordance with claim 1, further comprising:

a threshold setting step that sets a threshold used in the corresponding point estimation performed by the corresponding point estimating step;

a difference generating step that computes a difference between another color signal O of the first image A and the second color signal Y of the second image B;

a generated difference summing step that computes the sum of differences obtained by the difference generating step; and a threshold determination step that determines the threshold which produces the minimum value in the sums of the differences computed by the generated difference summing step based on a result of repetition of the corresponding point estimating step, the corresponding image assigning step, the image interpolation step, the difference generating step, and the generated difference summing step while changing the threshold set by the threshold setting step within a predetermined range.

4. An image generation apparatus for generating image information of a second color signal Y of a first image A by using a first color signal X of the first image A, and the first color signal X and the second color signal Y of a second image B, the apparatus comprising:
- a corresponding point estimating unit that estimates presence or absence of a point in the first color signal X of the second image B corresponding to each pixel position of the first color signal X of the first image A and also estimates the position of the relevant corresponding point;
- a corresponding image assigning unit that assigns, to each pixel position in the second color signal Y of the first image A for which the corresponding point estimating unit estimates that there is a corresponding point, image information of the corresponding position in the second color signal Y of the second image B; and
- an image interpolation unit that generates the second color signal Y at a pixel position in the first image A for which the corresponding point estimating unit estimates that there is no corresponding point, by means of interpolation using the image information of the second color signal Y assigned by the corresponding image assigning unit.

5. The image generation apparatus in accordance with claim 4, further comprising:
- a threshold setting unit that sets a threshold used in the corresponding point estimation performed by the corresponding point estimating unit;
- a first image A color converting unit that generates a third color signal M of the first image A by using the first color signal X of the first image A and the second color signal Y of the first image A which was generated by the corresponding image assigning unit and the image interpolation unit;
- a second image B color converting unit that generates the third color signal M of the second image B by using the first color signal X and the second color signal Y of the second image B;
- a difference generating unit that computes a difference between the third color signal M of the first image A and the third color signal M of the second image B at each corresponding point obtained by the corresponding point estimating unit;
- a generated difference summing unit that computes the sum of differences obtained by the difference generating unit; and
- a threshold determination unit that determines the threshold which produces the minimum value in the sums of the differences computed by the generated difference summing unit based on a result of repetition of operations of the corresponding point estimating unit, the corresponding image assigning unit, the image interpolation unit, the first image A color converting unit, the second image B color converting unit, the difference generating unit, and the generated difference summing unit while changing the threshold set by the threshold setting unit within a predetermined range.

6. The image generation apparatus in accordance with claim 4, further comprising:
- a threshold setting unit that sets a threshold used in the corresponding point estimation performed by the corresponding point estimating unit;
- a difference generating unit that computes a difference between another color signal O of the first image A and the second color signal Y of the second image B;
- a generated difference summing unit that computes the sum of differences obtained by the difference generating unit; and
- a threshold determination unit that determines the threshold which produces the minimum value in the sums of the differences computed by the generated difference summing unit based on a result of repetition of operations of the corresponding point estimating unit, the corresponding image assigning unit, the image interpolation unit, the difference generating unit, and the generated difference summing unit while changing the threshold set by the threshold setting unit within a predetermined range.

7. An image generation program by which a computer executes the image generation method in accordance with claim 1.

8. A computer-readable storage medium which stores an image generation program by which a computer executes the image generation method in accordance with claim 1.

* * * * *